United States Patent

[11] 3,614,758

[72] Inventors Michael I. Behr
South Pasadena;
Norman S. Blessum, Thousand Oaks;
James T. Wang, Thousand Oaks, all of Calif.

[21] Appl. No. 840,394
[22] Filed July 9, 1969
[45] Patented Oct. 19, 1971
[73] Assignee Burroughs Corporation
Detroit, Mich.

[54] METHOD AND APPARATUS FOR SATURATION-TYPE DIGITAL MAGNETIC RECORDING
15 Claims, 3 Drawing Figs.

[52] U.S. Cl. .......... 340/174.1 G
[51] Int. Cl. .......... G11b 5/06
[50] Field of Search .......... 340/174.1 B, 174.1 G

[56] References Cited

UNITED STATES PATENTS

| | | | |
|---|---|---|---|
| 3,488,662 | 1/1970 | Vallee | 340/174.1 |
| 3,503,059 | 3/1970 | Ambrro | 340/174.1 |

*Primary Examiner*—Stanley M. Urynowicz, Sr.
*Assistant Examiner*—Vincent P. Canney
*Attorney*—Christie, Parker & Hale

ABSTRACT: There is described a digital magnetic recording arrangement using saturation recording in which the intervals between successive data transitions from one saturation level to the other on the magnetic medium are varied according to a predetermined code and in which one or more pairs of control transitions are inserted on the tape between adjacent data transitions, the number of pairs of control transitions being determined by the spacing between the adjacent data transitions.

INVENTORS
MICHAEL I. BEHR
NORMAN S. BLESSUM
JAMES T. WANG
BY Christie, Parker & Hale
ATTORNEYS

METHOD AND APPARATUS FOR SATURATION-TYPE DIGITAL MAGNETIC RECORDING

BACKGROUND OF THE INVENTION

This invention relates to systems for recording digital information magnetically and reproducing the same information, and more particularly, is concerned with an arrangement for compensating for error-producing distortions at high-density recording levels.

DESCRIPTION OF THE PRIOR ART

In an effort to increase the packing density of information stored on magnetic tape or other magnetic storage media, a saturation recording technique is commonly employed in which information is recorded in the form of transitions between the two oppositely polarized saturation levels of the magnetic medium. These transitions may be coded in a number of different ways to represent binary information. In the conventional NRZ (nonreturn-to-zero) system, a binary 0 is represented by one saturation level and a binary 1 is represented by the opposite saturation level. In another common recording system, a binary 0 is represented by a continuation of either saturation level at clock time and a binary 1 is represented by a transition from one level to the other at clock time. Another coding system provides for the transition at the beginning of a clock period representing a 0, for example, and a transition in the middle of a clock period representing a 1.

Packing densities are limited by how close together in time these transitions can be recorded and still be accurately reproducible on playback. A resolution problem develops when the minimum physical distance between transition spacings on the moving magnetic tape becomes short compared to the gap width of the magnetic playback head. The state of the art places design limitations on the size of the magnetic gap, the spacing between the magnetic head and the magnetic medium, and the practical speed at which the magnetic medium moves across the head. With these design limitations, any attempt to increase the packing density by increasing the bit frequency results in signal deterioration on playback in the form of relative shifts in the signal peaks, causing timing errors, and reduction in peak amplitude, causing amplitude errors.

SUMMARY OF THE INVENTION

The present invention provides a technique for reducing the peak shift effect and also reducing peak amplitude variations, permitting bit frequencies to be increased and the distance between magnetic transitions be made shorter than has heretofore been possible. This is accomplished, according to the teaching of the present invention, by a technique of pulse crowding control in which pairs of control transitions are recorded between adjacent data transitions whenever the data transitions occur, in response to the particular input code, at intervals which exceed the minimum spacing between data transitions. Because the two control transitions of such a pair are so closely spaced, they are not resolved by the playback process, producing no substantial amplitude pulses on the output. It has been found that the compensating transitions have the effect of reducing the peak shift and equalizing the amplitude of output pulses generated by the data flux transitions, thereby reducing the problem of error from peak shift and amplitude variations otherwise encountered.

BRIEF DESCRIPTION OF THE DRAWINGS

For a better understanding of the invention, reference should be made to the accompanying drawings, wherein.

DESCRIPTION OF THE PREFERRED EMBODIMENT

Figure 1:
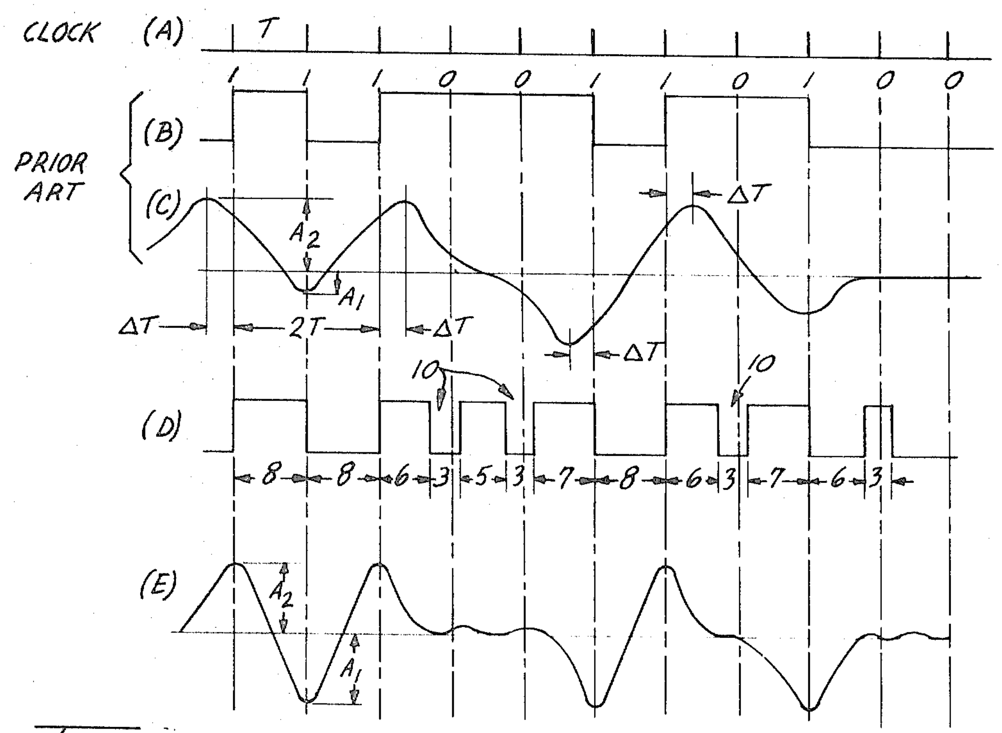
FIG. 1 is a series of wave forms useful in explaining the invention.

Referring to FIG. 1, there is shown the input wave forms of a conventional digital recording system illustrated by the wave forms of FIGS. 1A, 1B, and 1C. In such a system, shown here by way of example only, the recording of digital information is synchronized with a clock source which generates clock pulses at equal pulse intervals T. Binary 1's are represented by a transition from one level to another in synchronism with a clock pulse. Binary 0's are represented by the absence of such a transition from one level to the other at a clock pulse time. Thus, the wave form of FIG. 1B represents the series of binary digits 11100110100. If a current signal as represented by the wave form of FIG. 1B is applied to the recording head of a magnetic recording device, each transition of the input signal results in a change from one such saturating flux level to the opposite polarity saturating flux level in the magnetic recording medium. On playback, each transition produces an output pulse which, because of the characteristics of the magnetic recording and playback process, including the finite width of the gap of the playback head, has a substantial rise and fall time. Thus, the duration of the pulse on playback may be substantially longer than the minimum period T between information bits. As a result, if several binary 1 bits are recorded in a row preceded and followed by one or more binary 0 bits, the resulting wave form on the output of the read head becomes distorted by the interaction of the overlapping data pulses. The output wave form corresponds to the algebraic sum of the pulses produced by each transition. The more closely spaced the magnetic transitions become in relation to the read head gap, the greater this interaction and the more distortion which occurs. A limit is reached in the effective packing density when the distortion introduces information errors because the system can no longer provide sufficient definition to reproduce the digital information correctly.

The effect of the distortion on the playback signal is shown in FIG. 1C. In the case of three magnetic transitions in a row, representing three binary 1 input bits, it will be seen that the peak of the initial output pulse become shifted in time by an amount $\Delta T$ from the clock time, which is a leading peak shift. The second transition, on the other hand, is greatly reduced in amplitude, resulting in an amplitude $A_1$ which is very much less than the peak amplitude $A_2$ of the initial pulse in this series. The third peak in the series of three input transitions is shifted by an interval $\Delta T$ and lags the clock time. Also shown in FIG. 1C is the output wave form where there are two transitions at successive clock time. Again, there is an overall peak shift between the resulting two output pulses. The data pulses are not symmetrical either, exhibiting a faster rise time on the leading edge compared to the trailing edge.

According to the present invention, a method is provided by which both the peak shift and amplitude distortions described above may be minimized by introducing compensation during the recording of the digital information on tape. The method of the present invention involves the recording of additional control transitions on the magnetic medium intermediate the data transitions produced by the recording of data. These control transitions are recorded in pairs between adjacent data transitions whenever the interval between data transitions exceeds the normal clock interval, i.e., whenever one or more binary 0's are present between binary 1's in a series of digits. Thus, in the example shown in FIG. 1 in which binary bits are recorded as the absence of a transition at clock time for the recording of binary 0's, a pair of transitions are inserted for control purposes for each binary 0. Thus, as shown in FIG. 1D, the input wave form of FIG. 1B is modified by the addition of a pair of transitions for each binary 0, as indicated at 10. By making the spacing between transitions on the recording medium in each pair of control transitions relatively short compared to the gap length of the associated playback head, the control transitions do not produce any significant signal on playback but are effectively suppressed by the same crowding effect which produces the deterioration in the data pulses. FIG. 1E shows the output signal derived from the read head in response to a write signal with the control transitions present. The significant effect of the addition of the control transitions is that they substantially reduce the peak shift and equalize the amplitude of the information pulses at the output thereby significantly increasing the signal-to-noise ratio.

The distribution and relative position of the control transitions may be adjusted to get the maximum benefit of the compensation and may vary according to the packing density, the magnetic head parameters, the head-to-recording surface spacing, the recording format, and the information pattern. For the recording system described in connection with FIG. 1, a control transition distribution as shown in FIG. 1D was found to produce highly satisfactory compensation results where the clock interval T in terms of the corresponding length of recording medium was slightly greater than half the gap width of the playback head. The spacing between transitions is represented in FIG. 1D by the number of ⅛T intervals per space. The spacing between adjacent control transitions is ⅜T and ⅝T with the first control transition occurring 6/8T after the immediately preceding data transition. In other words, the first control transition of a pair leads the next clock time by 2/8T, while the second control transition of the pair trails the same clock period by ⅛T. This means that the last control transition leads the following data transition by 162 T. The nonsymmetrical spacing produced by the 6/8T interval versus the ⅞T interval, respectively, leading the first control transition and trailing the last control transition provides effective compensation for the nonsymmetrical pulse pattern generated in the absence of the compensation. The ⅝T spacing between pairs of control transitions was selected to produce minimum overshoot in the trailing edge of the preceding data pulse on the readout wave form.

Figure 3:
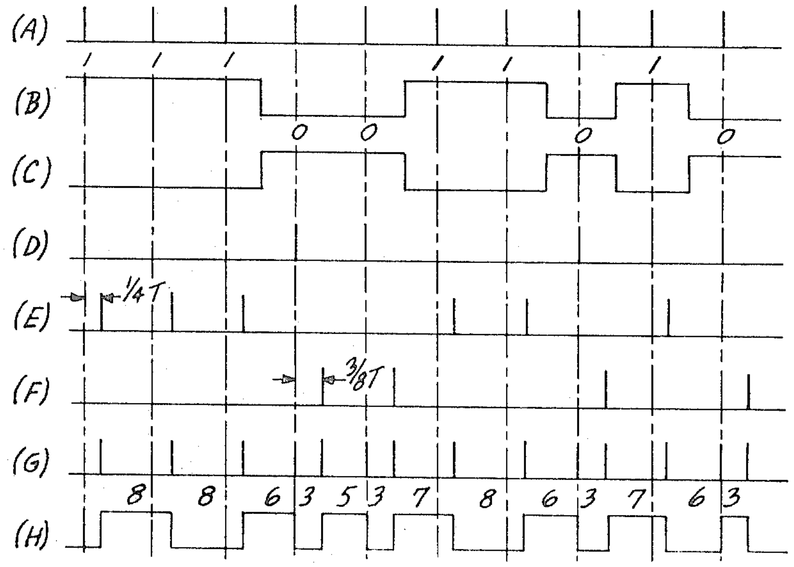
FIG. 3 is a series of wave forms illustrating the operation of FIG. 2.
Figure 2:
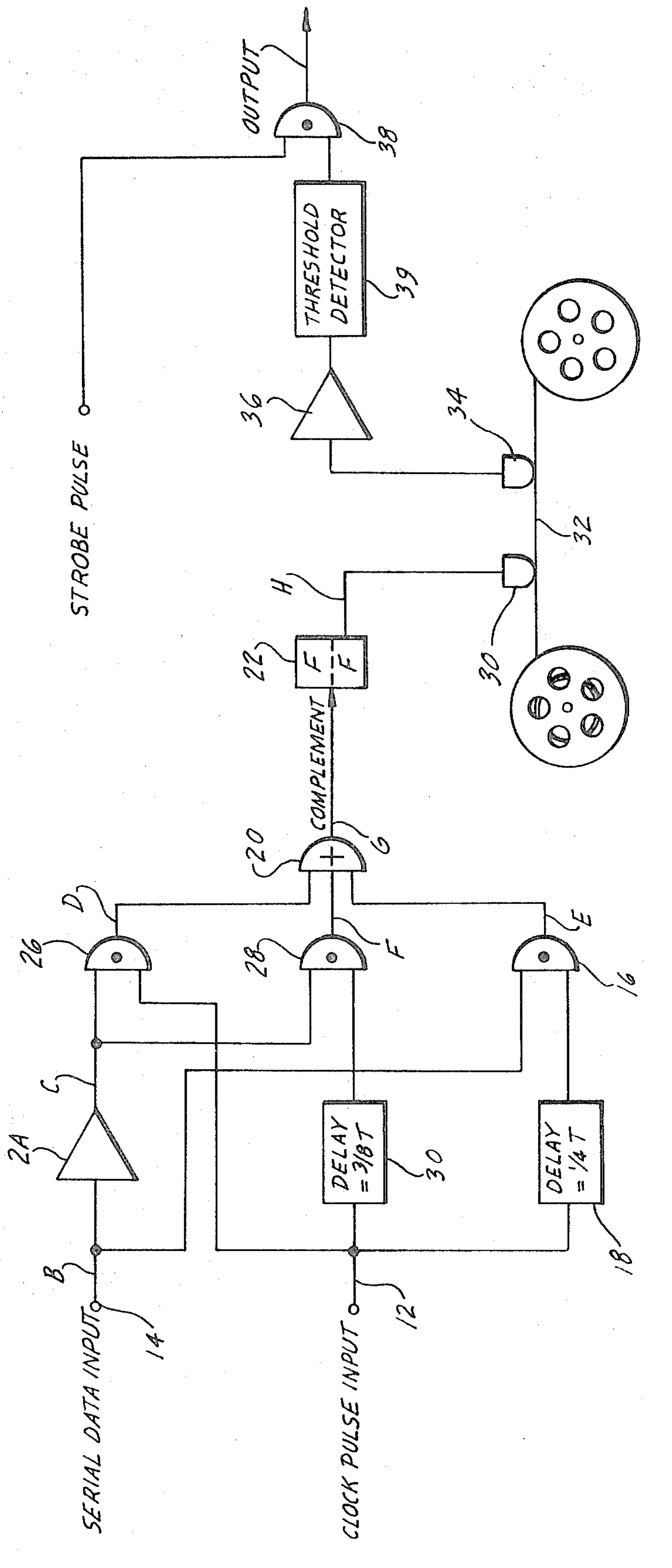
FIG. 2 is a schematic block diagram of one embodiment of the invention.

A suitable input circuit for generating the type of wave form illustrated in FIG. 1D is shown in FIG. 2. Clock pulses are applied to an input terminal 12 and binary information is applied to an input terminal 14. The wave form of the clock pulses applied to the input terminal 12 is shown in FIG. 3A, while the wave form of the information signal applied to the input terminal 14 is shown in FIG. 3B. Usually the information is represented by the input level, one input level representing binary 0's and a second input level representing binary 1's. The input signal at the terminal 14 is applied to an AND-gate 16 together with clock pulses coupled from the input terminal 12 through a delay circuit 18 which introduces a delay of approximately ¼ clock period. The output of the gate 16, as shown in FIG. 3E, consists of a clock pulse for each binary 1 and the absence of a clock pulse for each binary 0. The output of the gate 16 is applied through an OR-gate 20 to the complementing input of a flip-flop 22. Thus, each pulse on the output of the gate 16 complements the flip-flop 22 producing the required transition for each binary 1 at the input.

The control transitions are provided by connecting the input at the terminal 14 through an inverter 24 to a pair of AND-gates 26 and 28. Clock pulses from the terminal 12 are connected directly to the gate 26 and are connected to the gate 28 through a delay 30, which introduces a delay corresponding to ⅜ of a clock period. Thus, the output of the AND-circuit 26 provides a pulse for each binary 0 input condition while the output of the gate 28 similarly provides a pulse for each binary 0 input condition, but delayed by ⅜T. The output of the gates 26 and 28 are shown in FIGS. 3D and 3F, respectively.

These outputs are also coupled through the OR-gate 20 to the complementing input of the flip-flop 22. The output of the flip-flop, as shown in FIG. 3H, is the composite of data transitions and control transitions corresponding to the desired wave form discussed above in connection with FIG. 1D. This signal is then used to drive the magnetic recording head, indicated schematically at 30, for recording on magnetic tape or other suitable magnetic medium indicated generally at 32.

The information is reproduced by means of playback head 34, which is amplified by a suitable amplifier and filter 36 and applied to an AND-gate 38 through a threshold detector circuit 39 that passes only pulses that exceed a minimum amplitude threshold. Also strobe pulses occurring at the clock interval T are applied to the gate 38. The strobe pulses are gated to the output in response to the binary 1 condition recorded on tape but not in response to the binary 0 condition.

While the above invention has been particularly described in connection with a nonreturn-to-zero recording system in which data transitions represent binary 1's and the absence of transitions represent binary 0's, the method of the present invention may be applied to a number of different coding schemes wherever saturation recording is involved. A further advantage of the recording method of the present invention is that it permits more effective overwriting without prior erase, which has always been a problem in conventional NRZ systems when attempting to overwrite low packing density flux changes with high packing density flux changes, particularly when the same gap is used for recording and reading.

One of the significant aspects of the present invention is the fact that the compensation transitions are not equally spaced but are arranged in predetermined closely controlled spaced pairs with a larger interval between successive pairs. This unsymmetrical spacing is important in achieving reduction in peak shift of data peaks and, at the same time, preventing any extraneous peaks intermediate the data peaks on the readout signal. The control transitions, when arranged in closely spaced pairs may produce a small ripple in the output signal between data peaks, but the amplitude of the ripple is well below the amplitude threshold of the threshold detector. Improved suppression of the ripple can be obtained by the use of the sharp cutoff filter 36 because of the difference in signal and noise frequency spectra.

Another significant aspect of the present invention is that each pair of control transitions is shifted in time relative to the clock pulses so that the interval between a data transition and the first control transition of a pair is less than the interval between the second control transition of a pair and the next data transition. In the example given by the wave form of FIG. 3, these intervals are, respectively, 6/8T and ⅞T.

While the preferred embodiment utilizes a single pair of control transitions, it will be appreciated that, within the limits of practical switching times, it may be possible and desirable to provide more than one pair of control transitions during each clock pulse interval. By using more than one pair and adjusting the timing intervals, further improvement in the playback waveform can be achieved. The method of the present invention is not only applicable to NRZ type recording, but the technique of pulse crowding to modify output wave form is also applicable to other types of digital recording, such as frequency modulation methods in common use. It even permits complete elimination of any data pulse, thus permitting for the first time the generation of unipolar pulses from magnetic tape.

What is claimed is:

1. In a magnetic recording and playback system wherein input information is recorded on a magnetic medium as transitions in magnetization between two saturation states spaced at varying intervals and the transitions are detected by a magnetic playback head having a gap of predetermined length, the method of reducing the effective minimum spacing between such transitions on the recording medium comprising the steps of sensing when the spacing between successive data transitions in response to the input information exceeds a predetermined spacing, and recording at least one pair of control transitions in between said data transitions on the recording medium whenever the data transitions exceed said predetermined spacing.

2. The method of claim 1 wherein the spacing between each pair of control transitions is made substantially less than the minimum spacing between data transitions on the recording medium.

3. The method of claim 1 wherein the spacing between each pair of control transitions is made less than half the minimum spacing between data transitions.

4. The method of claim 1 wherein the pair of control transitions are unevenly spaced between the adjacent data transitions on the recording medium.

5. The method of claim 4 wherein the spacing between the first data transition and the following first control transition of said pair is made less than the spacing between the second control transition of the pair and the following data transition.

6. The method of claim 1 wherein the spacing between each of the control transitions of each pair is made smaller than half the gap length of the associated playback head.

7. In a digital recording system in which binary input information is recorded on a moving magnetic medium as transitions between two saturation levels at variable intervals and the minimum interval on the medium between successive recorded data transitions is greater than half the gap length of the associated magnetic playback head, the method of compensating for distortion effects due to crowding of the transitions comprising the steps of sensing in response to the input digital information when the interval between two successive data transitions is greater than said minimum interval, and inserting at least one pair of compensation transitions between saturation levels in between said two data transitions, the two compensation transitions of said pair being spaced at an interval on the recording medium that is less than half the gap length of the associated magnetic playback head.

8. The method as defined in claim 7 wherein the number of pairs of compensation transitions inserted between two adjacent data transitions is increased as the spacing between data transitions increases.

9. The method of claim 8 wherein the spacing between the first transitions of adjacent pairs of compensation transitions where more than one pair is inserted between data transitions corresponds to the minimum spacing between data transitions produced by said binary input information.

10. Apparatus for recording digital data on a magnetic medium comprising means including at least one magnetic transducer head having a magnetic gap for recording or playing back information on the magnetic medium, means for moving the recording medium past the gap at constant velocity, means for generating saturation flux across the gap of the recording head in either of two polarities, means for switching said flux generating means between said polarities to produce transitions in saturated flux level on the recording medium, means for controlling said switching means to produce flux transitions at controlled intervals, the intervals between said transitions being varied according to a predetermined code in response to said digital data, means activating said switching means to produce a pair of flux transitions on said medium with the interval between transitions of said pair being less than half the gap length of the playback head, and means responsive to said input data for activating said last-named means whenever the interval between transitions established by said controlling means exceeds a predetermined length, whereby at least one pair of closely spaced flux transitions may be inserted between information-controlled flux transitions on the tape.

11. Apparatus as defined in claim 10 further including a clock pulse source, means for synchronizing said control means for the switching means with the clock pulses whereby the transitions produced by the control means occur at the clock pulse intervals or integral multiples thereof.

12. Apparatus as defined in claim 11 further including means for synchronizing said activating means for the switching means with the clock pulse source, said activating means operating the switching means to produce a pair of flux transitions with each clock pulse when the control means does not produce a flux transition.

13. In a digital storage system in which binary input information is recorded and played back from a magnetic recording medium moving at constant velocity relative to magnetic recording and playback transducers, the recording and playback transducers having a magnetic core with a high reluctance gap positioned adjacent the surface of the recording medium, apparatus for recording the digital input information on the tape in response to said input information comprising a clock pulse source, means synchronized with the clock pulse source and coupled to the recording transducer for producing flux transitions between two magnetic saturation states on the recording medium, means responsive to the binary input information for activating said flux transition producing means to produce a single transition at selected clock pulse times determined by the input information, and means responsive to the binary input information for activating said flux transition producing means to produce a pair of flux transitions at each clock pulse time between said single transitions.

14. Apparatus as defined in claim 13 wherein said last-named means provides spacing between the flux transition of each said pair as recorded on the recording medium that is less than half the length of the gap in the magnetic core of the associated playback transducer.

15. In a digital recording system in which information is stored on a magnetic medium by recording spaced flux transitions between two saturation levels according to a predetermined code in which the spacing between successive flux transitions varies with the information code, the method of increasing the effective density of information storage comprising the steps of determining when the spacing between two adjacent ones of said flux transitions recorded on the magnetic medium for storing information exceeds some predetermined minimum spacing, and inserting at least one additional pair of such flux transitions in the space between any such adjacent flux transitions provided by the information code, the inserted pair of flux transitions being spaced apart a distance which is substantially less than said minimum spacing.

PO-1050
(5/69)

UNITED STATES PATENT OFFICE
CERTIFICATE OF CORRECTION

Patent No. 3,614,758 Dated October 19, 1971

Inventor(s) Michael I. Behr, Norman S. Blessum, and James T. Wang

It is certified that error appears in the above-identified patent and that said Letters Patent are hereby corrected as shown below:

Column 3, line 24, "162 T" should read --7/8 T--.

Signed and sealed this 18th day of April 1972.

(SEAL)
Attest:

EDWARD M.FLETCHER,JR.
Attesting Officer

ROBERT GOTTSCHALK
Commissioner of Patents